United States Patent
Rose

[19]

[11] Patent Number: 5,901,189
[45] Date of Patent: May 4, 1999

[54] SYMMETRICAL CORRELATOR

[75] Inventor: Dennis M. Rose, Sunnyvale, Calif.

[73] Assignee: National Semiconductor Corporation, Santa Clara, Calif.

[21] Appl. No.: 08/686,143

[22] Filed: Jul. 24, 1996

[51] Int. Cl.$^6$ ...................................................... H04L 7/00
[52] U.S. Cl. .................... 375/368; 375/343; 364/728.03; 377/64
[58] Field of Search ..................................... 375/207–210, 375/343, 350, 354, 355, 366, 367, 368; 364/728.03; 377/64, 73

[56] References Cited

U.S. PATENT DOCUMENTS

| | | | |
|---|---|---|---|
| 3,851,101 | 11/1974 | En et al. ................................... | 375/373 |
| 3,887,769 | 6/1975 | Cichetti, Jr. et al. .................... | 375/371 |
| 4,660,164 | 4/1987 | Leibowitz ............................ | 364/728.03 |
| 4,903,225 | 2/1990 | Brost ................................... | 364/728.03 |

*Primary Examiner*—Young T. Tse
*Attorney, Agent, or Firm*—Skjerven Morrill MacPherson Franklin & Friel LLP; Edward C. Kwok

[57] ABSTRACT

A symmetrical correlator includes a shift register into which the bit pattern resulting from oversampling a received data signal are clocked using a sample clock. During each cycle of the sample clock, a first number of the bits contained in the shift register are provided to an enable circuit. The enable circuit compares these bits to a predetermined bit pattern and, in response to the correlation therebetween, generates an enabling signal. Also during each cycle of the sample clock, a plurality of bit pairs symmetrical about a predetermined bit position in the shift register are compared for logical equivalency in a plurality of associated logical equivalency circuits. Each of the logic equivalency circuits provides a signal indicative of the logic equivalency of its associated bit pair to an adder. When enabled, the adder sums the binary values provided thereto by the logical equivalency circuits to generate a signal SUM indicative of the degree of symmetry of the bit pattern contained in the shift register about the predetermined bit position for that clock cycle. A peak value for the signal SUM indicates the center of the bit interval of the data signal is precisely associated with the predetermined bit position of the shift register.

4 Claims, 4 Drawing Sheets

SYMMETRICAL CORRELATOR

BACKGROUND

1. Field of the Invention

The present invention relates generally to data correlation and specifically to data correlation based on symmetrical bit patterns.

2. Description of Related Art

In the transmission of digital information, data is transmitted according to a clock signal. Since this clock signal is typically not transmitted along with the data, this clock signal must be "recovered" from and precisely aligned with the transmitted data. One technique for synchronizing the clock signal with an incoming data signal employs a conventional data correlator, as shown in FIG. 1. Correlator 10 typically operates in conjunction with a receiving unit to which the data signal is transmitted. This receiving unit has associated therewith a clock signal having a frequency f equal to the frequency of the clock signal employed in transmitting the data signal. Using a sample clock having a frequency N times greater than the predetermined frequency f, the data signal is oversampled in a conventional manner and clocked into an m-bit shift register 12. The bits stored in register 12 are compared to a predetermined bit pattern TEST stored in an m-bit register 14 using m associated conventional logical equivalency circuits 16 which may be for instance exclusive-NOR (XNOR) gates. The signal provided at the output terminal of each of logical equivalency circuits 16 is coupled to an associated input terminal of a conventional m-input adder 18. In response to the signals generated by logical equivalency circuits 16, adder 18 provides at an output terminal thereof a signal SUM indicative of the number of matches between associated bit pairs stored in shift register 12 and register 14. On each transition of the sample clock, the bits generated by oversampling the data signal are shifted one position in register 12, thereby resulting in a new value for signal SUM. This process is repeated until a peak value for signal SUM is detected, thereby indicating that a maximum correlation between an m-bit portion of the bit pattern resulting from oversampling the data signal and the m-bit pattern stored in register 14. In this manner, the center of the bit interval of the data signal may be located, thereby facilitating a precise alignment of the clock to the data signal.

Correlator 10 "looks" for a specific bit pattern in the data signal and then correlates that pattern with a predetermined pattern stored in register 14, as described above, to determine the center of the bit internal of the data signal. For example, where correlator 10 is configured to look for the bit pattern "010" in the data signal, signal TEST stored in register 14 is set equal to "0000111111110000". FIG. 2 shows a data signal DATA containing the bit pattern "0101". Signal DATA has a zero DC offset and, as a result, the "width" of the 0's and 1's in signal DATA are equal to one another, e.g., where the digital value to be represented is a "0" signal DATA is low for precisely one clock cycle and, where the digital value to be represented is a "1" signal DATA is high for precisely one clock period. Signal DATA is 8-times (8 x) oversampled to produce the bit pattern $DATA_{8X}$ (see FIG. 2). Thus, each "0" bit of signal DATA is associated with eight 0's in signal $DATA_{8X}$ and, accordingly, each "1" bit of signal DATA is associated with eight 1's in signal $DATA_{8X}$. The bits of signal $DATA_{8X}$ are shifted into shift register 12 as described earlier.

Shift register 12 is assumed to contain in its initial state all 0's. As bits of the signal $DATA_{8X}$ are shifted into shift register 12, the value of signal SUM generated at the output terminal of adder 18 changes depending upon the number of bits in register 12 which match associated ones of bits stored in register 14. For instance, after one clock cycle of the sample clock, where the bit pattern contained in register 12 is equal to "1000000000000000", the value of signal SUM is equal to 7, and after two clock cycles of the sample clock, where the bit pattern contained in register 12 is equal to "1100000000000000", the value of signal SUM is equal to 6, and so on.

The values of signal SUM generated as a function of that portion of the bit pattern of signal $DATA_{8X}$ are shown below in Table 1. The value of signal SUM peaks at 16 for exactly one cycle of the sample clock during which the bit pattern contained in register 12 exactly matches the pattern of signal TEST stored in register 14, i.e., where the bit pattern contained in register 12 is "0000111111110000". Signal SUM is equal to 14 for exactly one cycle of the sample clock before and exactly one cycle of the sample clock after the value of signal SUM peaks at 16, where the bit patterns in register 12 are equal to "0001111111100000" and "0000011111111000", respectively. In this manner, it may be discerned that the center of the "1" bit interval of signal DATA occurs precisely during that cycle of the sample clock when that portion of the bit pattern of signal $DATA_{8X}$ contained in register 12 is "0000111111110000".

| sample clock cycle | bit pattern contained in register 12 | value of signal SUM |
|---|---|---|
| n − 8 | 1111000000001111 | 0 |
| n − 7 | 1111100000000111 | 2 |
| n − 6 | 1111110000000011 | 4 |
| n − 5 | 1111111000000001 | 6 |
| n − 4 | 1111111100000000 | 8 |
| n − 3 | 0111111110000000 | 10 |
| n − 2 | 0011111111000000 | 12 |
| n − 1 | 0001111111100000 | 14 |
| n | 0000111111110000 | 16 |
| n + 1 | 0000011111111000 | 14 |
| n + 2 | 0000001111111100 | 12 |
| n + 3 | 0000000111111110 | 10 |
| n + 4 | 0000000011111111 | 8 |

The operation of correlator 10 as described above is degraded when the received data signal has a non-zero DC offset resulting from for instance noise, mismatch, or other transmission related errors. In such a case, the width of the logic high transitions (indicative of a binary one) and the width of the logic low transitions (indicative of a binary zero) of the received data signal may not be equal to one another. For example, a signal DATA' having a non-zero DC offset and its associated 8 x oversampled bit pattern $DATA_{8X}'$ are shown in FIG. 3. Note that signal DATA' represents the same bit pattern as does signal DATA of FIG. 2. However, each "0" bit of signal DATA' is associated with twelve "0" bits in signal $DATA_{8X}'$ and, accordingly, each "1" bit of signal DATA' is associated with four "1" bits in signal $DATA_{8X}'$.

The values of signal SUM generated by correlator 10 as a function of that portion of the bit pattern of signal $DATA_{8X}'$ contained in register 12 are shown below in Table 2. In this case, where the received data signal DATA' has a non-zero DC offset as described above, the maximum number of matches between bits contained register 12 and associated ones of bits stored in register 14 is twelve. Thus, the value of signal SUM peaks at twelve. However, signal SUM peaks at a value of twelve for not just one but five cycles of the sample clock. Thus, it is impossible to detect with precision the center of the bit interval of signal DATA' using correlator 10; it can only be discerned that the center of the interval occurs somewhere during those five cycles of the sample clock where the bits patterns contained in register 12 are "0000111100000000", "0000011110000000" "0000001111000000", "0000000111100000", and "0000000011110000".

TABLE 2

| sample clock cycle | bit pattern contained in register 12 | value of signal SUM |
|---|---|---|
| n − 8 | 1100000000001111 | 2 |
| n − 7 | 1110000000000111 | 2 |
| n − 6 | 1111000000000011 | 2 |
| n − 5 | 0111100000000001 | 5 |
| n − 4 | 0011110000000000 | 8 |
| n − 3 | 0001111000000000 | 10 |
| n − 2 | 0000111100000000 | 12 |
| n − 1 | 0000011110000000 | 12 |
| n | 0000001111000000 | 12 |
| n + 1 | 0000000111100000 | 12 |
| n + 2 | 0000000011110000 | 12 |
| n + 3 | 0000000001111000 | 10 |
| n + 4 | 0000000000111100 | 8 |

Accordingly, it would be desirable to be able to precisely determine the center of a bit interval of an incoming data signal having a non-zero DC offset.

SUMMARY

A symmetrical correlator disclosed herein overcomes problems in the art described above. In accordance with the present invention, a symmetrical correlator includes a shift register into which the bit pattern resulting from oversampling a received data signal is clocked using a sample clock. During each cycle of the sample clock, a first number of the bits contained in the shift register are provided to an enable circuit. The enable circuit compares these bits to a predetermined bit pattern and, in response to the correlation therebetween, generates an enabling signal. Also during each cycle of the sample clock, a plurality of bit pairs symmetrical about a predetermined bit position in the shift register are compared for logical equivalency in a plurality of associated logical equivalency circuits. Each of the logic equivalency circuits provides a signal indicative of the logic equivalency of its associated bit pair to an adder. When enabled by the enabling signal generated by the enabling circuit, the adder sums the binary values provided thereto by the logical equivalency circuits to generate a signal SUM indicative of the degree of symmetry of the bit pattern contained in the shift register about the predetermined bit position for that clock cycle. A peak value for the signal SUM indicates the center of the bit interval of the data signal is precisely associated with the predetermined bit position of the shift register. In other embodiments, where the enabling circuit is not provided, a greater number of bits are compared for symmetry.

DETAILED DESCRIPTION

Figure 4:
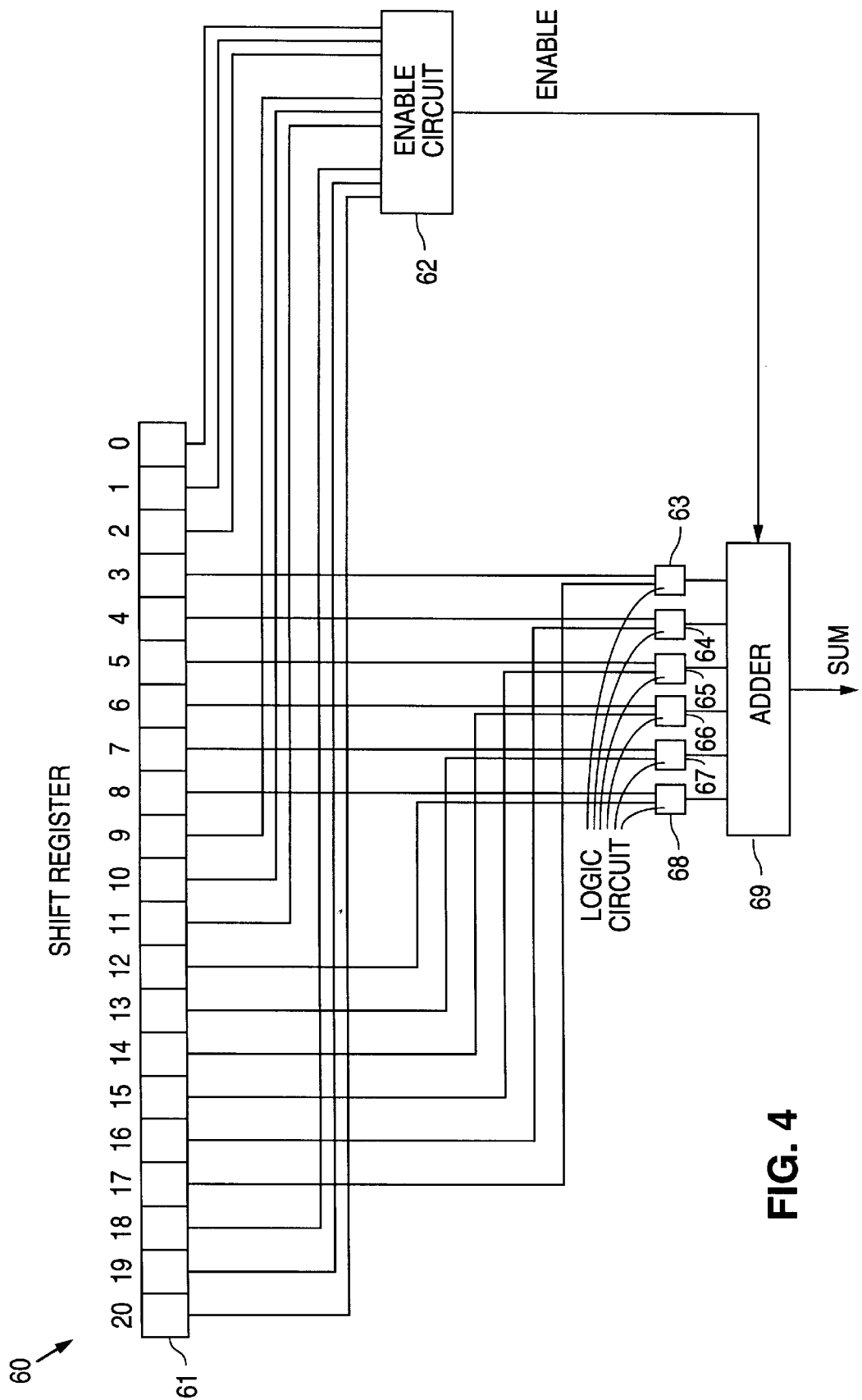
FIG. 4 is a block diagram of a symmetrical correlator in accordance with the present invention.
Figure 5:
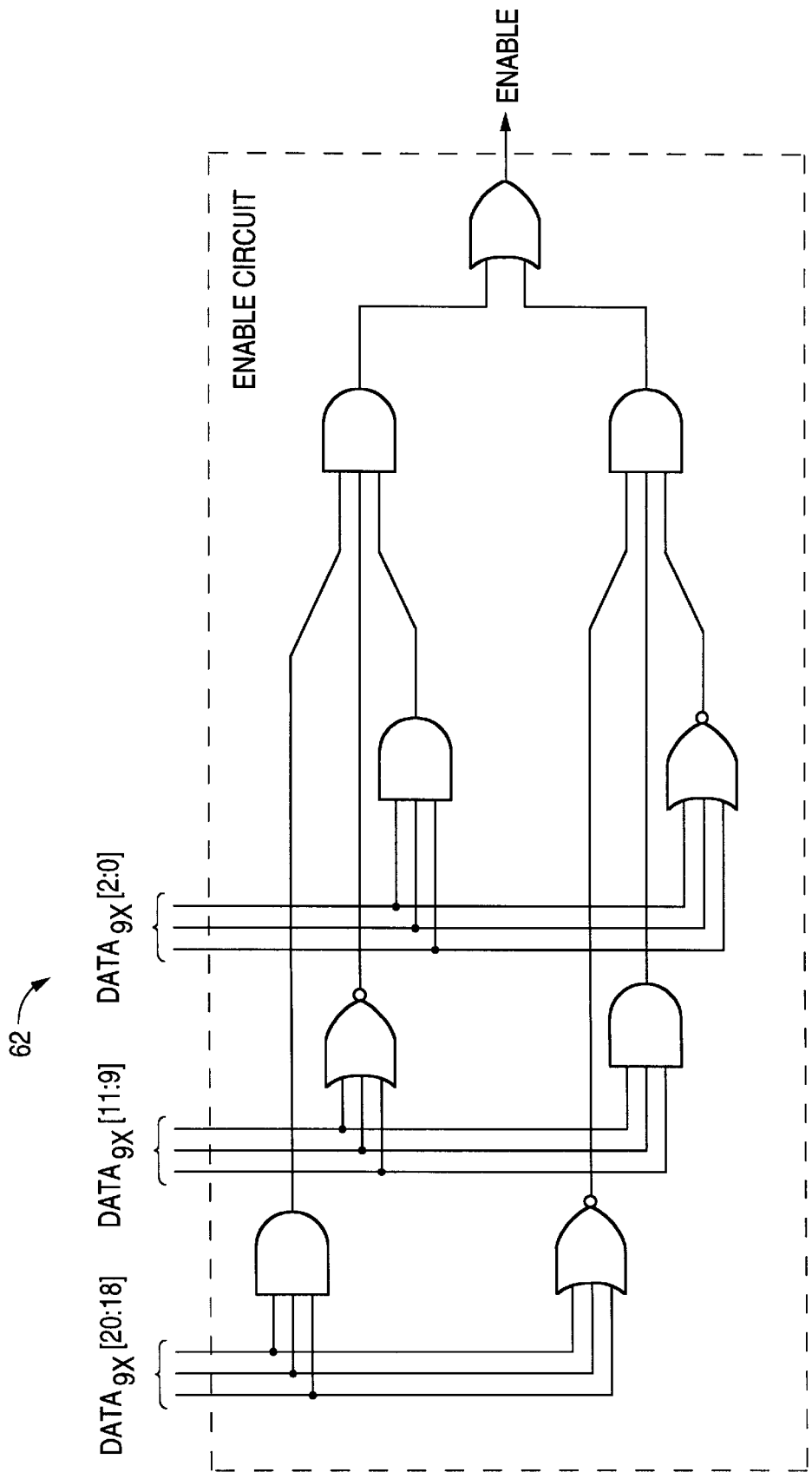
FIG. 5 is a schematic diagram of an enabling circuit used in accordance with the present invention.

FIG. 4 shows a symmetrical correlator 60 in accordance with one embodiment of the present invention which may be used in a variety of suitable contexts, including but not limited to clock recovery. A received data signal is 9-times (9 x) oversampled in a conventional manner and the resultant bit pattern is clocked into a 21-bit shift register 61 using a sample clock (not shown for simplicity). The first three, the middle three, and the last three of the bits contained in shift register 61, i.e., positions [2:0], [11:9], and [20:18], respectively, are provided to an enable circuit 62, which, in response thereto, generates at an output terminal thereof an active high enabling signal ENABLE. Referring also to FIG. 5, enable circuit 62 forces signal ENABLE high only when the bit values stored in positions [20:18], [11:9], and [2:0] of register 61 are either "111", "000", and "111", respectively, or "000", "111", and "000", respectively. Otherwise, enable circuit 62 causes signal ENABLE to be inactive i.e. logic low or "0". Signal ENABLE is provided to a conventional 6-input adder circuit 69.

The bits in positions [3], [4], [5], [6], [7], and [8] of register 61 are compared to the bits in positions [17], [16], [15], [14], [13], and [12], respectively, of register 61 via respective logical equivalency circuits 63–68. In some embodiments, logical equivalency circuits 63–68 are exclusive NOR (XNOR) gates. Each of logical equivalency circuits 63–68, in response to its respective input signal pair, provides a binary output signal to an associated input terminal of adder 69. Thus, where for instance the bit values in positions [3] and [17] are equal, logical equivalency circuit 63 provides a logic high i.e. a "1" to adder 69. When enabled, i.e., when validity detect circuit 62 forces signal ENABLE high, adder 69 adds the binary values provided thereto by logical equivalency circuits 63–68 and generates at an output terminal thereof a sum signal SUM. Note that the integer value indicated by signal SUM varies as the bit pattern generated by oversampling the received data signal is shifted through shift register 61. In this manner, the degree of symmetry between the six bits to the left of position [11] of register 61 and the six bits to the right of position [9] of register 61 may be quantified in signal SUM. In accordance with the present invention, the peaking of the value of signal SUM indicates that the center of the received data signal corresponds to the bit (of the resultant bit pattern generated by 9 x oversampling the received data signal) in position [10] of register 61.

Figure 6:
FIG. 6 is a timing diagram illustrating bit patterns of a data signal DATA having a zero DC offset and a bit pattern $DATA_{9X}$ resulting from a 9-times oversampling of signal DATA.
Figure 6:

Symmetrical correlator 60 determines with precision the center of the bit interval of a received data signal having a zero DC offset as follows. For instance, a data signal $DATA_{in}$ having a bit pattern "101" and a zero DC offset is shown in FIG. 6. Signal $DATA_{in}$ is 9 x oversampled in a well known manner to produce a corresponding bit pattern $DATA_{9X}$, where each bit of signal $DATA_{in}$ corresponds to 9 bits of signal $DATA_{9X}$, as illustrated in FIG. 6. As the bit pattern "111111111000000000111111111" of signal $DATA_{9X}$ is shifted one bit at a time into register 61, the values of signals SUM and ENABLE change, as indicated below in Table 3. Clock cycle n−3 corresponds to the time interval during which the right most 21 bits of the 27-bit portion of signal $DATA_{9X}$ shown in FIG. 6 are contained in register 61 and clock cycle n+3 corresponds to the time interval during which the left most 21 bits of the 27-bit portion of signal $DATA_{9X}$ shown in FIG. 6 are contained in register 61.

TABLE 3

| sample clock cycle | bit pattern contained in register 61 | signal SUM | signal ENABLE |
|---|---|---|---|
| n − 3 | 111000000000111111111 | 0 | 1 |
| n − 2 | 111100000000011111111 | 2 | 1 |
| n − 1 | 111110000000001111111 | 4 | 1 |
| n | 111111000000000111111 | 6 | 1 |
| n + 1 | 111111100000000011111 | 4 | 1 |
| n + 2 | 111111110000000001111 | 2 | 1 |
| n + 3 | 111111111000000000111 | 0 | 1 |

The value of signal SUM peaks at six during clock cycle n and, thus, where the bit pattern contained in register 61 is "111111000000000111111". Thus, the "0" bit contained in bit position [10] of register 61 corresponds to the center of bit interval of "0" in the "101" bit pattern of received signal $DATA_{in}$. In other words, the center of the "0" bit of the pattern "101" of signal $DATA_{in}$ occurs during that cycle of the sample clock during which the bit pattern stored in register 61 is equal to "111111000000000111111".

Figure 7:
FIG. 7 is a timing diagram illustrating bit patterns of a data signal DATA' having a non-zero DC offset and a bit pattern $DATA_{9X}'$ resulting from a 9 x oversampling of signal DATA'.
Figure 7:
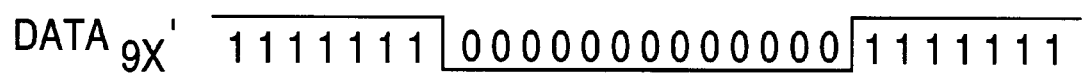

Symmetrical correlator 60 also determines with precision the center of the bit interval of received data signals having a non-zero DC offset. For instance, FIG. 7 shows a portion of a received data signal $DATA_{in}'$ having a bit pattern "101". Signal $DATA_{in}'$ is 9 x oversampled to produce a corresponding bit pattern in signal $DATA_{9x}'$, also shown in FIG. 7. Although signals $DATA_{in}$ (FIG. 6) and $DATA_{in}'$ (FIG. 7) represent identical bit patterns, the non-zero DC offset of signal $DATA_{in}'$ results in the width of the 0's of signal $DATA_{in}'$ being greater than the width of the 1's of signal $DATA_{in}'$. It can be seen from signal $DATA_{9x}'$ that the pulse width of the 0's of signal $DATA_{in}'$ are approximately 13 cycles of the sample clock (not shown for simplicity) while the pulse width of the 1's of signal $DATA_{in}'$ are approximately 7 cycles of the sample clock. As the bit pattern "111111100000000000001111111" of signal $DATA_{9x}'$ is shifted through register 61, the values of SUM and ENABLE change in a manner similar to that described above. For example, Table 4 below shows the values of signals SUM and ENABLE as a function of the sample clock cycle and the bit pattern contained in register 61. Clock cycle n−3 corresponds to the time interval during which the right most 21 bits of the 27-bit portion of signal $DATA_{9x}'$ shown in FIG. 7 are contained in register 61, and clock cycle n+3 corresponds to the time interval during which the left most 21 bits of the 27-bit portion of signal $DATA_{9x}'$ shown in FIG. 7 are contained in register 61.

TABLE 4

| sample clock cycle | bit pattern contained in register 61 | signal SUM | signal ENABLE |
|---|---|---|---|
| n − 3 | 100000000000001111111 | n/a | 0 |
| n − 2 | 110000000000001111111 | n/a | 0 |
| n − 1 | 111000000000000111111 | 4 | 1 |
| n | 111100000000000001111 | 6 | 1 |
| n + 1 | 111110000000000000111 | 4 | 1 |
| n + 2 | 111111000000000000011 | n/a | 0 |
| n + 3 | 111111100000000000001 | n/a | 0 |

Figure 1:
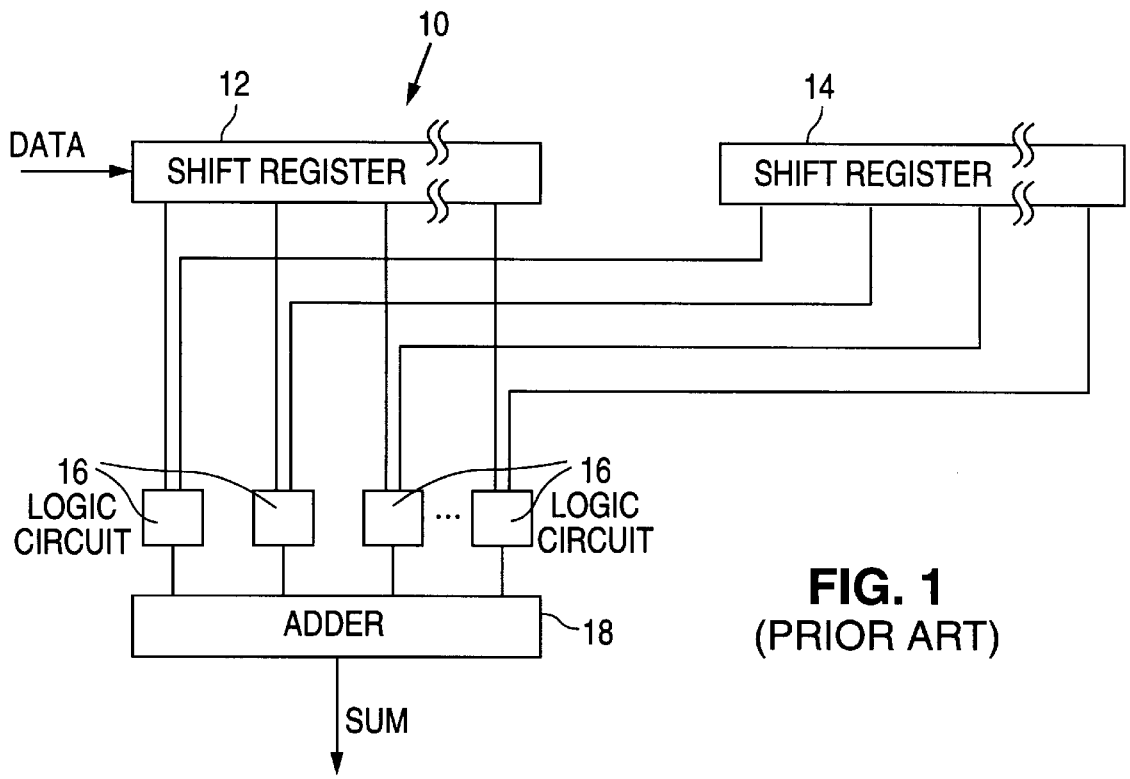
FIG. 1 is a conventional data correlator circuit 10 used to determine the center of a bit interval of a data signal.
Figure 2:
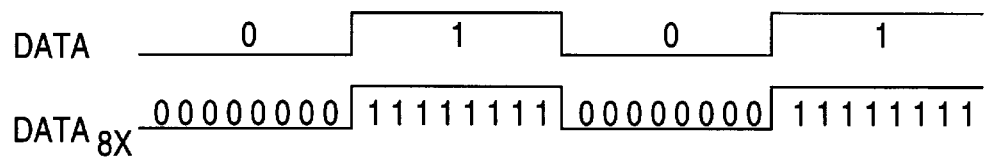
FIG. 2 is a timing diagram illustrating bit patterns of a data signal DATA having a zero DC offset and a bit pattern $DATA_{8X}$ resulting from an 8-times oversampling of signal DATA.
Figure 3:
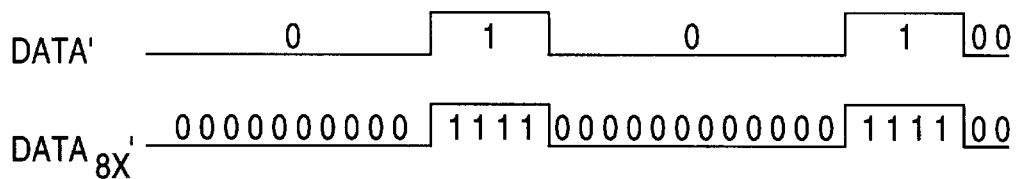
FIG. 3 a is timing diagram illustrating bit patterns of a data signal DATA' having a non-zero DC offset and a bit pattern $DATA_{8X}'$ resulting from an 8-times oversampling of signal DATA'.

The value of the signal SUM peaks at six for precisely one cycle of the sample clock when the bit pattern contained in register 61 is equal to "111100000000000001111". Thus, the center of the bit interval of signal $DATA_{in}'$ occurs during cycle n of the sample clock, as indicated in Table 4 above. In this manner, the center of the bit interval of a data signal having a non-zero DC offset lies within just one cycle of the sample clock. In contrast, the precision with which the prior art correlator 10 shown in FIG. 1 locates the center of the bit interval of a signal having a non-zero DC offset, such as for instance signal DATA' (FIG. 3), is approximately five cycles of the sample clock. Accordingly, symmetrical correlator 60 facilitates with great accuracy aligning a clock signal associated with a receiving unit with a received data signal, irrespective of whether the received data signal has a zero or a non-zero DC offset.

While particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit and scope of this invention.

Specifically, it is to be understood that the specific structure described above with reference to FIGS. 4 and 5 is intended to be illustrative only and should not be construed in a limiting manner. Thus, the number and specific selection of bits positions of register 61 which are provided to enable circuit 62 in other embodiments may vary, where in such other embodiments enable circuit 62 should be modified accordingly. Further, it should be noted that enable circuit 62 is not necessary to the proper operation of embodiments in accordance with the present invention, but rather serves to reduce the number of bits which need to be compared for symmetry about a specific point to achieve a desired accuracy. In other words, in order to maintain a desired degree of precision, elimination of enable circuit 62 requires that the number of bits compared for symmetry be increased. In a similar manner, the number of bit positions of register 61 selected for symmetrical correlation via logical equivalency circuits 63–68 may in other embodiments differ from that described above. Further, the size of register 61 and the oversampling rate employed to create the bit pattern that is clocked into register 61 may also vary between embodiments of the present invention, depending upon desired performance characteristics.

I claim:

1. A data correlator comprising:
   an n-bit shift register for receiving a stream of bits indicative of a data signal;
   a plurality of logical equivalency circuits each having first and second input terminals coupled to receive first and second bits of an associated one of bit pairs of said data signal stored in said n-bit shift register and each having an output terminal, wherein the positions of said first and second bits of each of said bit pairs with respect to said n-bit shift register are symmetrical about a predetermined bit position of said n-bit shift register; and an adder having a plurality of input terminals each coupled to an associated one of said output terminals, wherein said adder generates a number indicative of the number of bit pairs with identical first and second bit values, said number being used in identifying the center of a bit interval of said data signal.

2. A data correlator comprising:

an n-bit shift register for receiving a stream of bits indicative of a data signal;

a plurality of logical equivalency circuits each having first and second input terminals coupled to receive first and second bits of an associated one of bit pairs stored in said n-bit shift register and each having an output terminal, wherein the positions of said first and second bits of each of said bit pairs with respect to said n-bit shift register are symmetrical about a predetermined bit position of said n-bit shift register;

an adder having a plurality of input terminals each coupled to an associated one of said output terminals, wherein said adder generates a number indicative of the number of bit pairs with identical first and second bit values, said number being used in identifying the center of a bit interval of said data signal; and an enable circuit having a plurality of input terminals coupled to receive selected ones of said bits stored in said n-bit shift register and having an output terminal coupled to an enable terminal of said adder, said enable circuit comparing said selected ones of said bits stored in said n-bit shift register to a predetermined bit pattern and, in response thereto, providing an enabling signal to said adder.

3. A method of data correlation comprising the steps of:

(a) receiving a stream of bits by n-bit shift register indicative of a data signal;

(b) comparing a plurality of pairs of said bits for symmetry about a predetermined bit of said stream of bits using a plurality of logical equivalency circuits; and (c) generating in response to said step of comparing a number indicative of the number of pairs of bits containing identical bit values, said number being used in identifying the center of a bit interval of said data signal using an adder.

4. A method of data correlation comprising the steps of:

(a) receiving a stream of bits by n-bit shift register indicative of a data signal;

(b) comparing a plurality of pairs of said bits for symmetry about a predetermined bit of said stream of bits using a plurality of logical equivalency circuits;

(c) comparing a selected number of bits by an enable circuit in said stream of bits to a predetermined bit pattern;

(d) providing in response to step (c) an enabling signal from said enable circuit to an adder; and (e) generating in response to steps (b) and (d) a number indicative of the number of pairs of bits containing identical bit values, said number being used in identifying the center of a bit interval of said data signal using said adder.

* * * * *